(12) United States Patent
Geppert et al.

(10) Patent No.: US 8,861,709 B2
(45) Date of Patent: Oct. 14, 2014

(54) METHOD FOR INDICATING CALL-CENTER AGENT AVAILABILITY

(75) Inventors: Birgit Andrea Geppert, Basking Ridge, NJ (US); Reinhard Peter Klemm, Basking Ridge, NJ (US); Frank Michael Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1304 days.

(21) Appl. No.: 12/467,735

(22) Filed: May 18, 2009

(65) Prior Publication Data

US 2010/0290614 A1   Nov. 18, 2010

(51) Int. Cl.
*H04M 3/00*   (2006.01)
*H04M 5/00*   (2006.01)
*H04M 3/51*   (2006.01)
*H04M 3/42*   (2006.01)
*H04M 7/12*   (2006.01)

(52) U.S. Cl.
CPC .............. *H04M 3/51* (2013.01); *H04M 7/123* (2013.01); *H04M 2201/38* (2013.01); *H04M 3/42102* (2013.01); *H04M 3/4211* (2013.01)

USPC ............ 379/265.11; 379/265.01; 379/265.05; 379/265.12

(58) Field of Classification Search
USPC ............ 379/265.11, 265.14, 220.01, 266.01, 379/265.12, 265.01, 265.05; 709/206
See application file for complete search history.

(56) References Cited

U.S. PATENT DOCUMENTS

| | | | |
|---|---|---|---|
| 2003/0002646 A1* | 1/2003 | Gutta et al. | 379/220.01 |
| 2008/0205630 A1* | 8/2008 | Deshpande | 379/266.01 |
| 2009/0327441 A1* | 12/2009 | Lee et al. | 709/206 |
| 2010/0080378 A1* | 4/2010 | Katz | 379/265.14 |

* cited by examiner

*Primary Examiner* — Thjuan K Addy

(57) ABSTRACT

A method for informing a caller of the availability of a call-center agent who can assist the caller without some of the disadvantages of the prior art is disclosed. In accordance with the illustrative embodiment of the present invention, when a caller accesses the address book in the memory of his or her telecommunications terminal (such as a telephone) the caller will see both the contact information for the call center and the availability of a call-center agent.

17 Claims, 5 Drawing Sheets

Telecommunications System 100

METHOD FOR INDICATING CALL-CENTER AGENT AVAILABILITY

FIELD OF THE INVENTION

The present invention relates to telecommunications in general, and, more particularly, to telecommunications call centers.

BACKGROUND OF THE INVENTION

When a person has an issue with a product, the person often calls a call center that is associated with the enterprise that sold the product. These call centers are often reached by dialing a toll-free "1-800" number.

When the call center answers the call, the caller is usually presented with a menu of choices such as "Press 1 for English or press 2 for Spanish." After the caller makes his or her choice, the caller is, after some wait, connected to a call-center agent. All too often the caller is kept on hold for an extended period of time. This usually only serves to aggravate the caller and tie up bandwidth for the call-center.

Often, after waiting on hold for an extended period of time, the caller is connected with a call-center agent who is unable to assist the caller with his or her problem. This only creates further frustration for the caller as the caller is then placed on hold again to wait for a call-center agent who can assist the caller with his or her problem.

SUMMARY OF THE INVENTION

The present invention provides a solution that informs a caller of the availability of a call-center agent who can assist the caller without some of the disadvantages of the prior art.

In accordance with the illustrative embodiment of the present invention, when a caller accesses the address book in the memory of his or her telecommunications terminal (such as a telephone) the caller will see both the contact information for the call center and the current availability of a call-center agent. This is accomplished by having the caller's telecommunications terminal send an inquiry via a data protocol to the call center when the contact information for the call center is accessed in the terminal's memory.

Upon receipt of the inquiry, which includes some indicium of the caller (or the caller's terminal), the call center selects a call-center agent that is appropriate for the caller. The call center then determines the selected call-center agent's availability and reports it back to the caller's terminal. The caller can elect to call the call center or not based on this information.

One advantage of the present invention is that the caller does not need to initiate a voice call to the call center in order to determine the availability of an appropriate call-center agent, the inquiry does not use call-center bandwidth reserved for voice calls.

DETAILED DESCRIPTION

Figure 1:
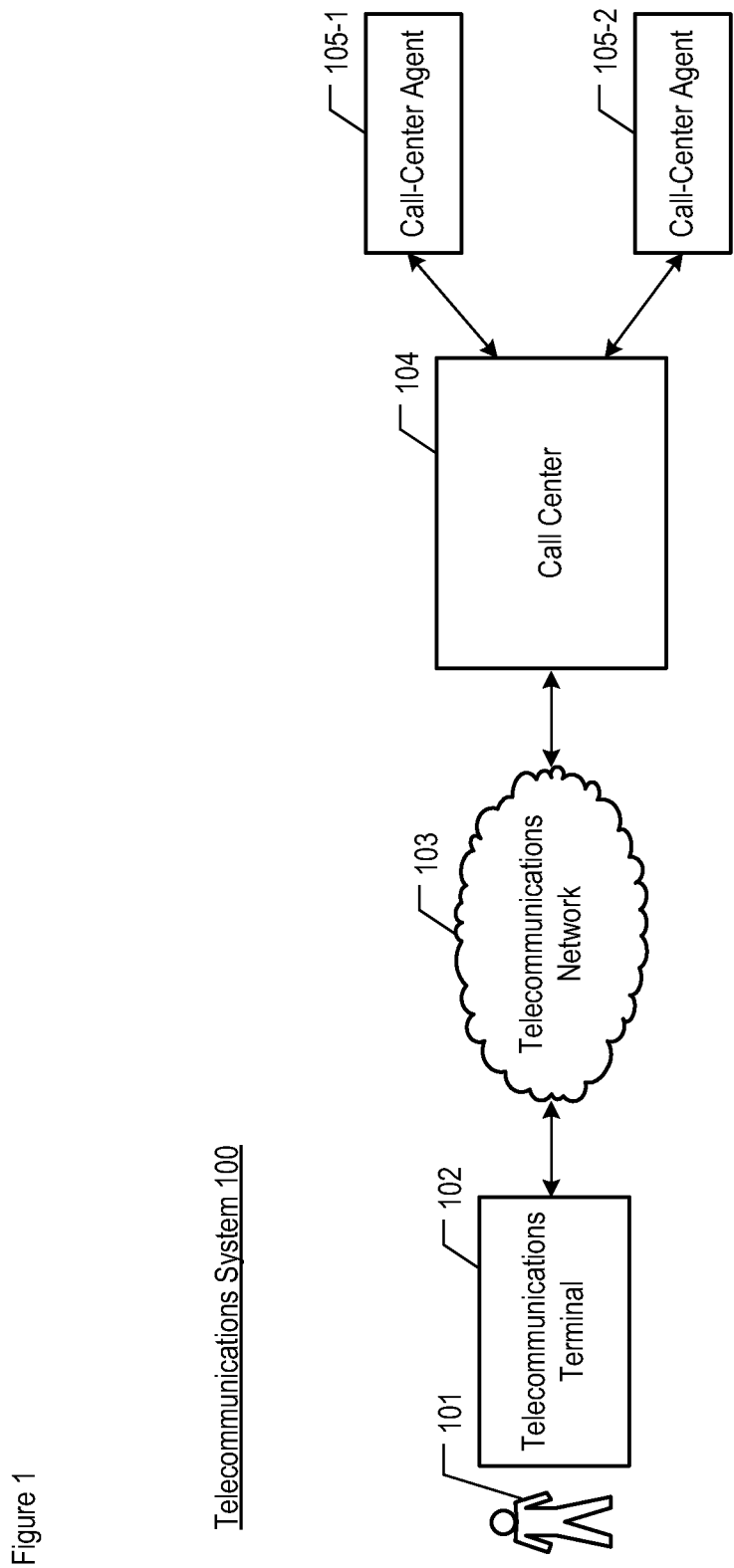
FIG. 1 depicts a schematic diagram of the salient components of telecommunications system 100 in accordance with the illustrative embodiment of the present invention.

FIG. 1 depicts a schematic diagram of the salient components of telecommunications system 100 in accordance with the illustrative embodiment of the present invention. Telecommunications system 100 comprises: caller 101, telecommunications terminal 102, telecommunications network 103, call center 104, call-center agent 105-1, and call-center agent 105-2.

Although the illustrative embodiment comprises one caller, it will be clear to those skilled in the art, after reading this disclosure, how to make and use alternative embodiments of the present invention that comprise any number of callers.

Although the illustrative embodiment comprises one telecommunications terminal, it will be clear to those skilled in the art, after reading this disclosure, how to make and use alternative embodiments of the present invention that comprise any number of telecommunications terminals.

Although the illustrative embodiment comprises one call center, it will be clear to those skilled in the art, after reading this disclosure, how to make and use alternative embodiments of the present invention that comprise any number of call centers.

Although the illustrative embodiment comprises two call-center agents, it will be clear to those skilled in the art, after reading this disclosure, how to make and use alternative embodiments that comprise any number of call-center agents.

Although the illustrative embodiment depicts call-center agents 105-1 and 105-2 co-located with call center 104, it will be clear to those skilled in the art, after reading this disclosure, how to make and use alternative embodiments of the present invention in one or more call-center agents are remotely connected to call center 104 through telecommunications network 103.

Caller 101 is a person who desires to contact an enterprise for information regarding a product. In accordance with the illustrative embodiment, caller 101 contacts the enterprise via telecommunications terminal 102 by selecting the call center from an address book integrated into telecommunications terminal 102, but it will be clear to those skilled in the art, after reading this disclosure, how to make and use alternative embodiments of the present invention in which the caller contacts the enterprise via another modality, such as, for example, and without limitation, dialing a number for call center 104, instant messaging, short-message service, etc.

In accordance with the illustrative embodiment of the present invention, telecommunications terminal 102 is a wireless terminal (e.g., cell phone, personal digital assistant, iPhone, Blackberry, etc.), but it will be clear to those skilled in the art how to make and use telecommunications system 100 utilizing, for example and without limitation, mobile telecommunications terminals such as mobile telephones, private branch exchange extensions, personal computers, or any device capable of connecting to telecommunications network 103.

Telecommunications network 103 is the Public Switched Telephone Network, but it will be clear to those skilled in the art, after reading this disclosure, how to make and use alternative embodiments of the present invention in which telecommunication network 103 is another network, for example and without limitation, the Internet, a private data network, a satellite network, etc.

Call center 104 is hardware and software for receiving a call from caller 101, for communicating with caller 101, and for coordinating communication with caller 101 and call-center agents 105-1 and 105-2. In particular, call center 104 is capable of performing the functionality described below and with respect to FIG. 2.

Call-center agent 105-1 and call-center agent 105-2 are people who can assist caller 101 with regard to the product of interest. Each call-center agent has a different availability based on several factors, including, for example and without limitation: whether or not the call-center agent is assisting a different caller and the queue of callers to be processed. Although the call-center agents are called agents, it does not imply the existence or absence of a principal-agent relationship between the call-center agent and call center 104 or the enterprise selling the product.

Figure 2:
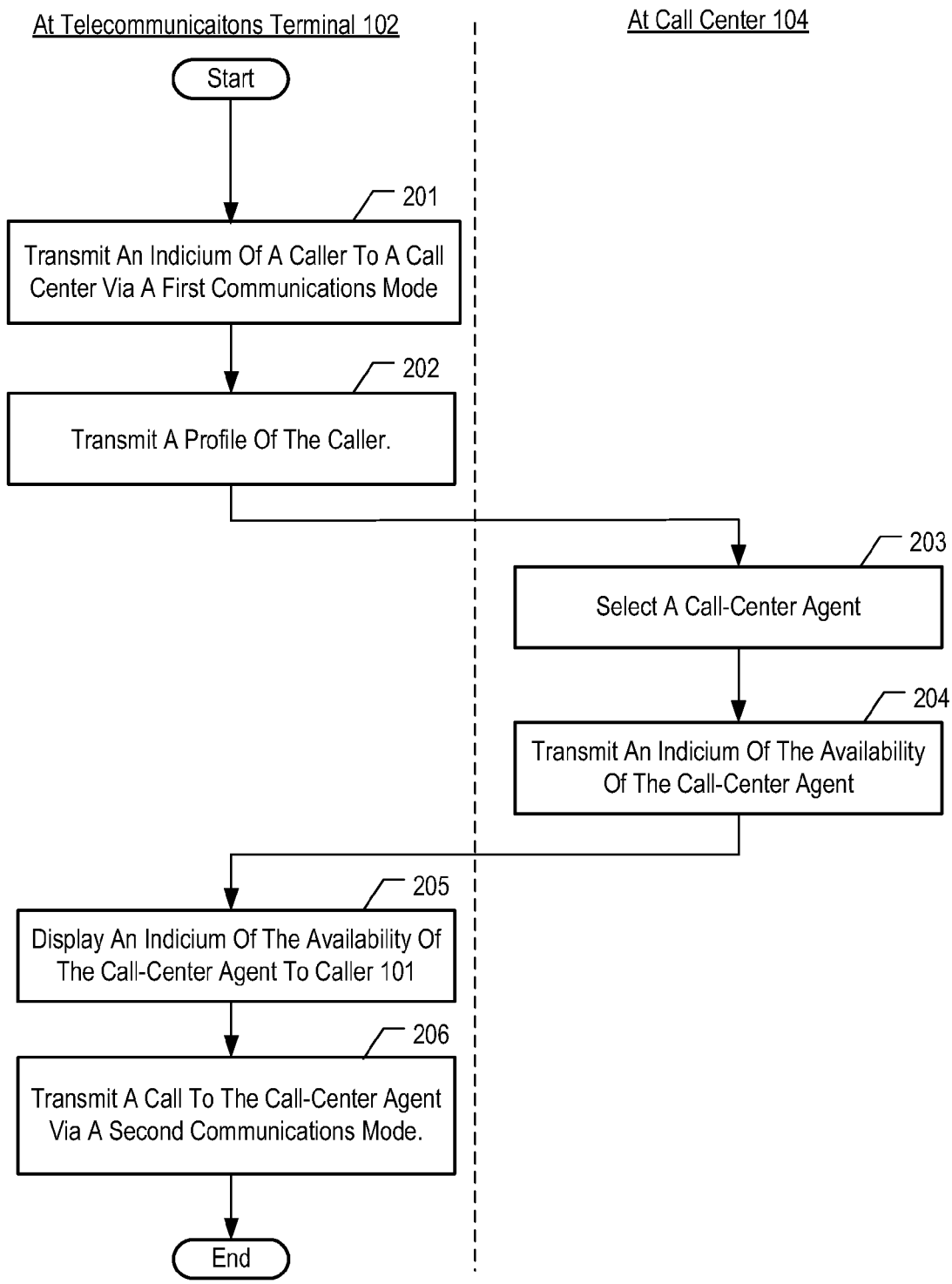
FIG. 2 depicts a flowchart of the salient tasks associated with the operation of the illustrative embodiment of the present invention.

FIG. 2 depicts a flowchart of the salient tasks associated with the operation of the illustrative embodiment of the present invention.

In accordance with the illustrative embodiment of the present invention, tasks 201, 202, 205, and 206 are performed at telecommunications terminal 102. However, it will be clear to one skilled in the art, after reading this disclosure how to make and use other implementations of the present invention in which the some or all of the steps are performed by another device, for example, and without limitation, call center 104.

In accordance with the illustrative embodiment of the present invention, tasks 203 and 204 are performed at call center 104. However, it will be clear to one skilled in the art, after reading this disclosure how to make and use other implementations of the present invention in which the steps are performed by another device, for example, and without limitation, telecommunications terminal 102.

At task 201, telecommunications terminal 102 transmits an indicium of a caller to a call center via a first communications mode. For the purposes of this specification, a "communication mode" is defined as:
 i. voice, or
 ii. text, or
 iii. data, or
 iv video, or
 v. any combination of i, ii, iii, and iv.

In accordance with the illustrative embodiment of the present invention, this transmission would be initiated by the caller 101 accessing the memory of telecommunications terminal 102. The caller would do this by opening an address book stored in telecommunications terminal 102. It will be clear to one skilled in the art how to make and use embodiments of the present invention that perform task 201.

The indicium comprises information such as, for example and without limitation, a telephone number of caller 101, the name of caller 101, an Internet Protocol address of telecommunications terminal 102, the Media Access Control address (MAC address) of telecommunications terminal 102, etc. It will be clear to one skilled in the art, after reading this disclosure, how to perform task 202 in which one or more of the comprised data is omitted from the first signal. In any event, it will be clear to one skilled in the art how to make and use embodiments of the present invention that perform task 202.

Also in accordance with the illustrative embodiment of the present invention, the indicium of the caller comprises that contact information of call center 104 exists in the memory of telecommunications terminal 102.

Also in accordance with the illustrative embodiment of the present invention, the first communications mode would be a data mode such as, for example and without limitation, e-mail, a short message service message, an instant message, a session initiation protocol message, etc.

At task 202, telecommunications terminal 102 transmits a caller profile of caller 101.

At task 203, call center 104 chooses a call-center agent.

At task 204, call center 104 transmits an indicium of the availability of the call-center agent.

At task 205, telecommunications terminal 102 displays an indicium of the availability of the call-center agent. In accordance with the illustrative embodiment of the present invention, the indication will be a visual notification to caller 101 on the screen of telecommunications terminal 102. It will be clear to one skilled in the art, after reading this disclosure, how to perform task 205 in which the indication to the caller can be, for example, and without limitation, an audio signal (such as ringing or a beep at telecommunications terminal 102), the activating of a light on telecommunications terminal 102, etc.

At task 206, telecommunications terminal 102 transmits a call to the call-center agent via a second communications mode.

It will be clear to one skilled in the art, after reading this disclosure how to make and use other implementations of the present invention in which one or more of the steps are omitted or are performed in a different order than the one presented or simultaneously.

Figure 3:
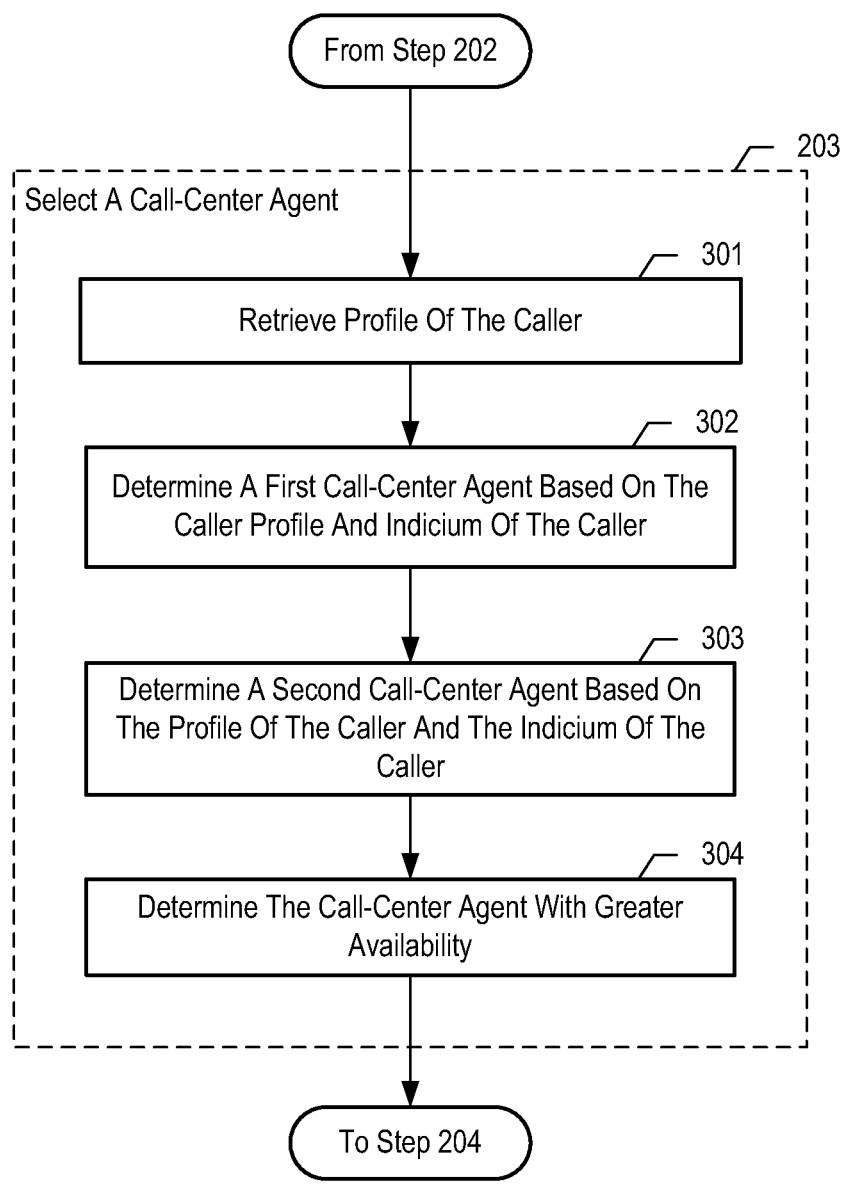
FIG. 3 depicts a flowchart of the salient tasks associated with the operation of task 203 in accordance with the illustrative embodiment of the present invention.

FIG. 3 depicts a flowchart of the salient tasks associated with the operation of task 203 in accordance with the illustrative embodiment of the present invention.

At task 301, call center 104 retrieves the caller profile of caller 101. In accordance with the illustrative embodiment, the profile of caller 101 is accessed in the memory of call center 104 because of the information about caller 101 transmitted in the first signal. It will be clear to those skilled in the art, after reading this disclosure, how to make and use alternative embodiments of the present invention in which the profile of caller 101 is accessed in another way, for example and without limitation, by receiving a profile of caller 101 from telecommunications terminal the 102. Accessing the profile of caller 101 enables call center 104 to obtain availability of a call-center agent at the call center.

At task 302, call center 104 determines a first call-center agent based on the profile of the caller and indicium of the caller. In accordance with the illustrative embodiment of present invention, the profile of caller 101 is used to determine whether call-center agent 105-1 or call-center agent 105-2 is better suited to handle the issue that caller 101 wishes to discuss. For instance, the profile may have information such as, for example and without limitation, the language spoken by caller 101, products purchased by caller 101, information about previous calls made by caller 101, etc. Also, accessing the profile enables call center 104 to prioritize service. For example one caller may be identified as a higher priority than another caller. The selection of the call-center agent would be an agent appropriate to assist caller 101.

At task 303, call center 104 determines a second call-center agent based on the caller profile and indicium of the caller.

At task 304, call center 104 determines the call-center agent with greater availability. In accordance with the illustrative embodiment of the present invention, task 304 can be performed on a regular basis to determine the most available call-center agent at any given time. For example, and without limitation, call center 104 can check the availability of the appropriate call-center agents and determine the availability of the most available call-center agent appropriate to caller 101 at regular time intervals, such as every 30 seconds, every minute, every ten minutes, etc.

The availability of call-center agent 105-1 and call-center agent 105-2 is determined by the availability information received. Availability information is a status indicator that conveys ability and willingness of a potential communication partner—in this case, call-center agent 105-1 or call-center agent 105-2—to communicate.

Availability information is information such as, for example, and without limitation, "available," "busy," "on a call," "out," etc. Availability can be different for different devices of the same call-center agent. For example, call-center agent 105-1 may be "on a call" with another person, but may still be available by instant message. The availability information is used to determine the availability of call-center agent 105-1 and call-center agent 105-2 for a call from caller 101. In accordance with the illustrative embodiment of the present invention, one call-center agent may be "more available" than another call-center agent. It will be clear to one skilled in the art how to make and use embodiments of the present invention that perform task 304.

Figure 4:
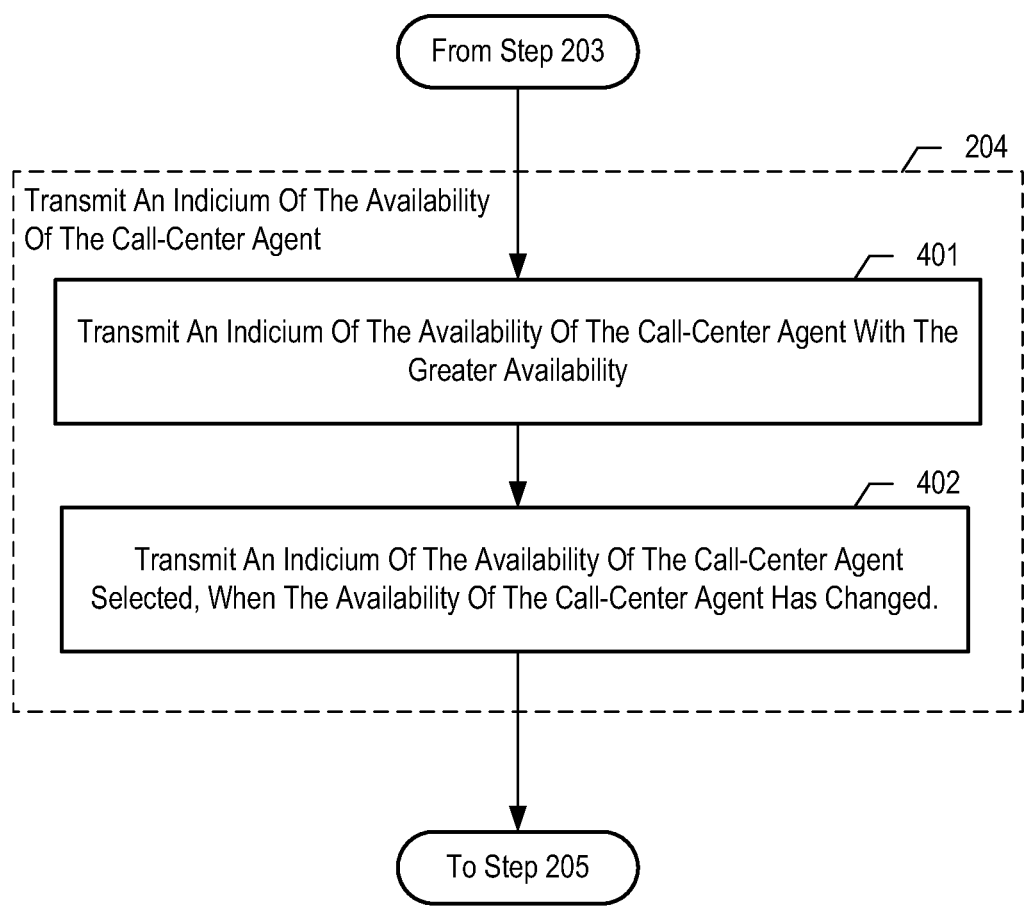
FIG. 4 depicts a flowchart of the salient tasks associated with the operation of task 204 in accordance with the illustrative embodiment of the present invention.

FIG. 4 depicts a flowchart of the salient tasks associated with the operation of task 204 in accordance with the illustrative embodiment of the present invention.

At task 401, call center 104 transmits an indicium of the availability of the appropriate call-center agent with the greater availability.

At task 402, call center 104 transmits an indicium of the availability of the call-center agent selected, when the availability of the call-center agent has changed. In accordance with the illustrative embodiment of the present invention, task 402 can be performed on a continuous or period basis For example, and without limitation, call center 104 can transmit the availability of the selected call-center agent to telecommunications terminal 102 at regular time intervals, such as every 30 seconds, every minute, every ten minutes, etc. Further in accordance with the illustrative embodiment, this can be performed on a "push" basis, in which no further input on the part of caller 101 is required to receive regular updates from call center 104.

Figure 5:
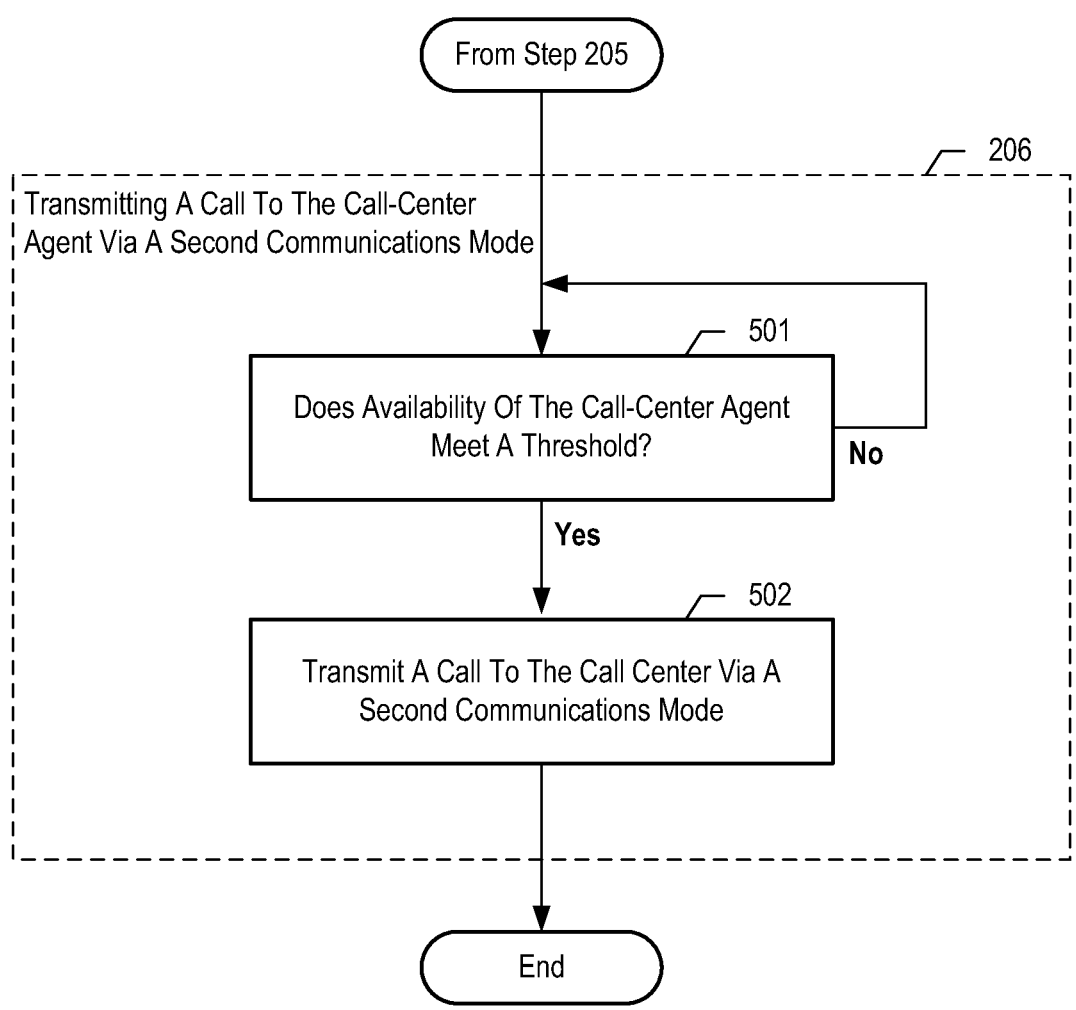
FIG. 5 depicts a flowchart of the salient tasks associated with the operation of task 206 in accordance with the illustrative embodiment of the present invention.

FIG. 5 depicts a flowchart of the salient tasks associated with the operation of task 206 in accordance with the illustrative embodiment of the present invention.

At task 501, telecommunications terminal 102 determines whether the availability of the call-center agent meets a threshold.

In accordance with one embodiment of the present invention, telecommunications terminal 102 will automatically connect when the availability of the most available call-center agent appropriate for caller 101 reaches a certain threshold.

In accordance with another embodiment of the present invention, this determination is made by caller 101. Having seen an indicium of the availability of the call-center agent, caller 101 decides whether or not to make a call to the call center.

At task 502, telecommunications terminal 102 transmits a call to the call center via a second communications mode. In accordance with the illustrative embodiment of the present invention, the second communications mode would be an audio mode such as, for example and without limitation, a telephone call over the Public Switched Telephone Network, voice over Internet Protocol call, etc. It will be clear to one skilled in the art, after reading this disclosure how to perform task 502.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, from a user, a request to access contact information of a call center from an address book in a memory of a telecommunications terminal;
   in response to the request, transmitting, from a telecommunications terminal, a first indicium of a caller to a call center, wherein the first indicium of the caller is transmitted from the telecommunication terminal via a non-voice communications mode;
   receiving, at the telecommunications terminal and from the call center, a second indicium of voice availability of a call-center agent, wherein the call-center agent is selected by the call center from a plurality of call-center agents based on a match of at least once characteristic of the call-center agent with the caller;
   presenting, to the user and at the telecommunications terminal, the voice availability of the call-center agent in the address book; and
   upon receiving a request through the address book to establish voice communications with the call center, establishing an initial voice communication session between the caller and the call-center agent.

2. The method of claim 1 wherein the call center retrieves a caller profile based on the first indicium of the caller.

3. The method of claim 2 wherein the call-center agent is selected based on the caller profile.

4. The method of claim 1 wherein transmitting the first indicium of the a caller comprises transmitting a caller profile of the caller.

5. The method of claim 1 wherein the second indicium of the availability of the call-center agent comprises a notification that the availability of the call-center agent has changed.

6. The method of claim 1 wherein the call-center agent is an agent from the plurality of call-center agents having a greatest availability.

7. The method of claim 1, further comprising establishing the initial communication session between the caller and the call-center agent when the availability of the call-center agent reaches a threshold.

8. The method of claim 1 further comprising:
   receiving, at the telecommunications terminal, a third indicium of availability of a second call-center agent selected from the plurality of call-center agents if the second call-center agent has a greater availability than the first call-center agent.

9. A method comprising:
   receiving, at a call center, a first indicium of a caller, wherein the first indicium of the caller is received from a telecommunications terminal associated with the caller in response to a request to access contact information associated with the call center and wherein the first indicium is recived via a non-voice communication mode;
   transmitting, from the call center, a second indicium of voice availability of a call-center agent for presentation to the user at the telecommunications terminal, the voice availability of the call-center agent in the address book, wherein the call-center agent is selected from a plurality of call-center agents based on the first indicium of the caller; and
   upon receiving a request through the address book to establish voice communications with the call center, establishing an initial communication session between the caller and the call-center agent via a second communication mode that is different than the first communication mode.

10. The method of claim 9 wherein the first call-center agent is selected from the plurality of call-center agents by the call center.

11. The method of claim 9 wherein the call center retrieves a caller profile based on the first indicium of the caller.

12. The method of claim 11 wherein the call-center agent is selected based on the caller profile.

13. The method of claim 9 further comprising receiving, at the call center, a caller profile of the caller.

14. The method of claim 9 wherein the first call-center agent is an agent from the plurality of call-center agents having a greatest availability.

15. The method of claim 9, further comprising establishing the initial communication session between the caller the call-center agent when the availability of the call-center agent reaches a threshold.

16. The method of claim 9 wherein the second indicium of the availability of the first call-center agent comprises a notification that the availability of the call-center agent has changed.

17. The method of claim 9 further comprising:
transmitting, from the call center, a third indicium of the availability of a second call-center agent who is selected by the call center from the plurality of call-center agents if the second call-center agent has a greater availability than call-center agent.

\* \* \* \* \*